Nov. 18, 1947.  W. C. SPEED  2,431,282
QUARTZ CRYSTAL HOLDER
Filed Nov. 20, 1943  2 Sheets-Sheet 1

INVENTOR.
William C. Speed
BY
ATTORNEYS

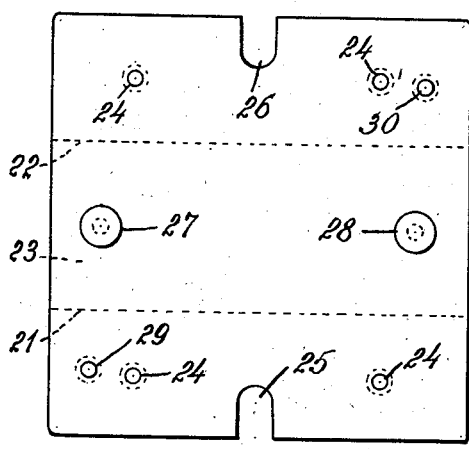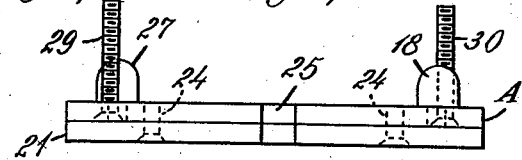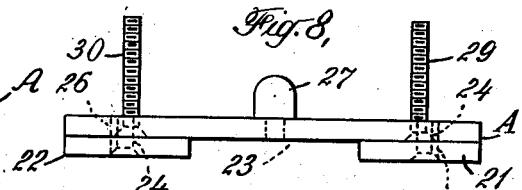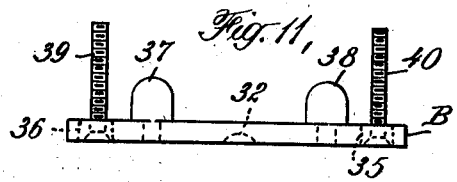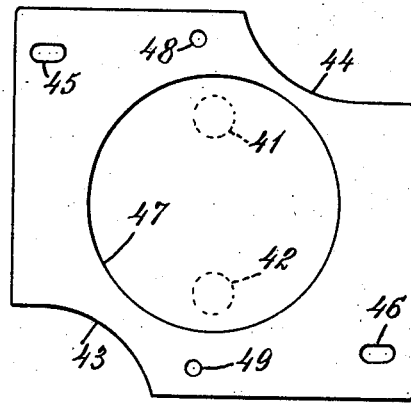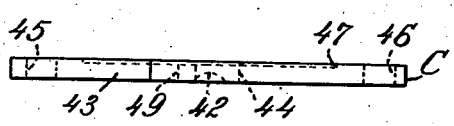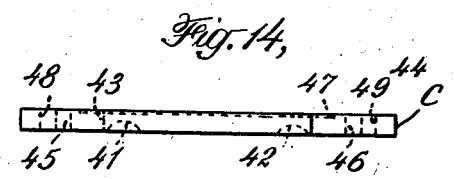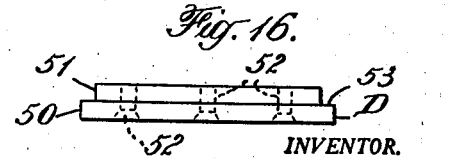

Patented Nov. 18, 1947

2,431,282

UNITED STATES PATENT OFFICE 2,431,282

QUARTZ CRYSTAL HOLDER

William C. Speed, New York, N. Y., assignor to Reeves-Ely Laboratories, Inc., New York, N. Y., a corporation of New York Application November 20, 1943, Serial No. 511,198

8 Claims. (Cl. 125—35)

This invention relates to quartz oscillator plates and has for its object, more particularly, improvements in crystal holders employed in the manufacture of quartz oscillator plates.

A quartz crystal may be mounted on the holder and its optical and electrical, or mechanical, axes suitably determined. This may be done in such a manner that the axes are placed and fixed in predetermined relationship with respect to a given portion of the holder so that the crystal, while still mounted on the holder, may be cut at any desired angle to make oscillator plates.

The invention will be better understood by referring to the accompanying drawings, taken in conjuction with the following description, in which Fig. 1 is a perspective plan view of a holder showing a quartz crystal mounted thereon;

Figs. 6, 7 and 8 are plan, side and end views, respectively, of the fixed base of the holder;

Figs. 9, 10 and 11 are plan. side and end views, respectively, of the lower tiltable base of the holder;

Figs. 12, 13 and 14 are plan, side and end views, respectively, of the upper tiltable base of the holder; and Figs. 15 and 16 are plan and side views, respectively, of the rotatable base of the holder.

Figure 1:
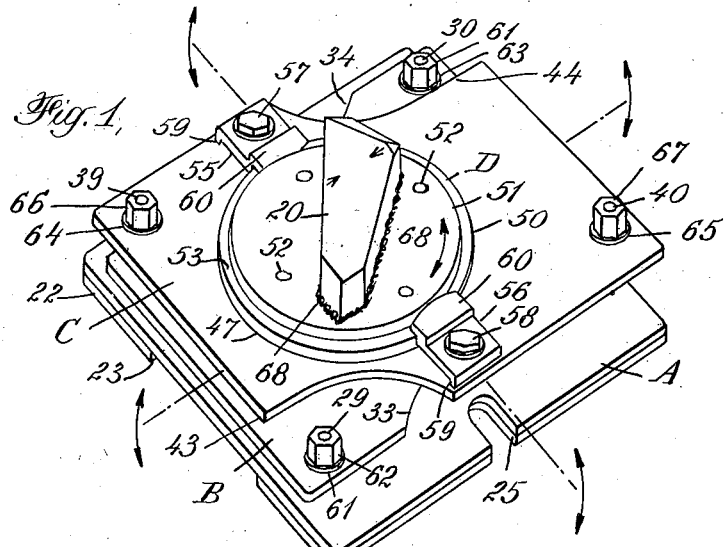
Figure 2:
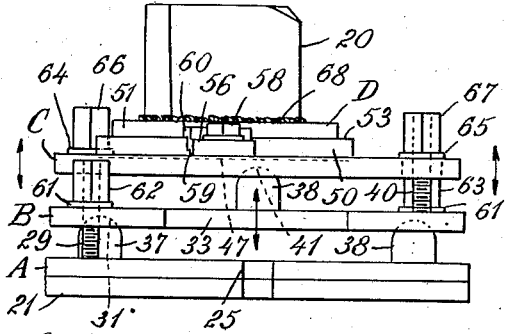
Figs. 2, 3 and 4 are side, end and plan views respectively.
Figure 3:
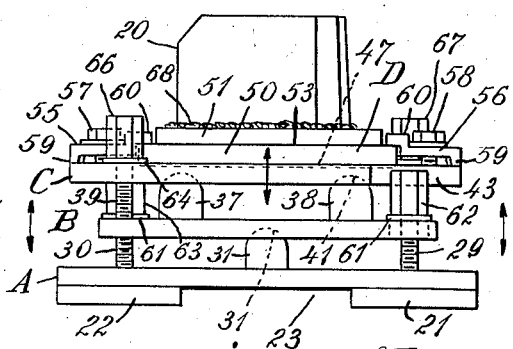
Figure 4:
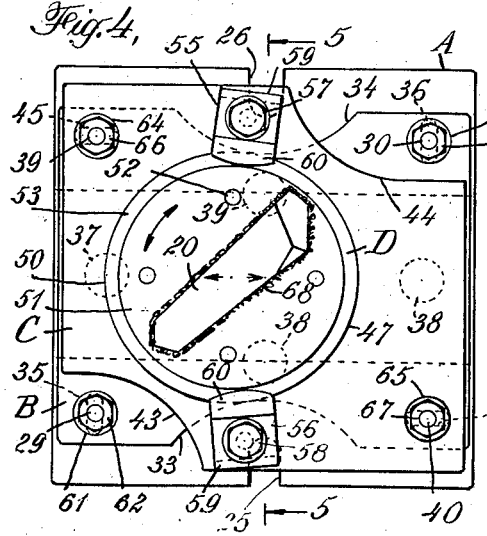
Figure 5:
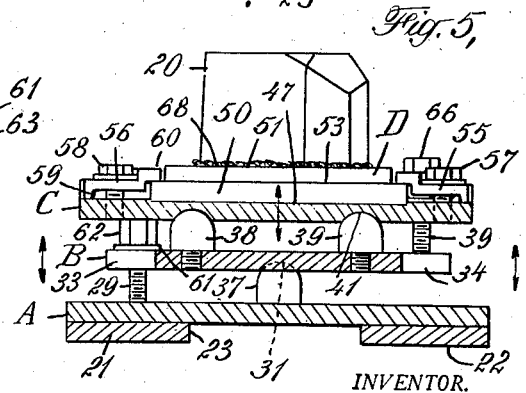
Fig. 5 is a sectional view on the line 5—5 of Fig. 4.

Referring first to Figs. 1 to 5, the holder shown comprises a series of superposed supports or bases: a fixed base A, a lower tiltable base B, an upper tiltable base C and a rotatable base D. Bases D and C are pivotally tiltable at right angles to each other as well as toward and away from base A. Base D is rotatable laterally on base C. A quartz crystal 20 is shown mounted on base D.

Base A, as detailed in Figs. 6, 7 and 8, is provided with a pair of spaced side members 21 and 22 secured thereto by means of screws 24 to form an elongated and inverted guide channel 23, open at both ends. The channel is rectangular in shape and is adapted to fit over a raised member, not shown, when the holder is employed, for example, in conjunction with apparatus to determine the axes of quartz crystals and to cut the crystals at predetermined angles. The part of the holder that defines the channel is advantageously used as a reference part to which the axes and angle of cut may be suitably adjusted. In the construction shown, the sides of the base have a pair of oppositely spaced slots 25 and 26 to accommodate bolts, not shown, with which to secure the holder to such other apparatus. A pair of spaced pivot posts 27 and 28 is integrally secured to and centrally of the base at opposite ends; the upper ends of the posts being rounded, as shown, so that base B may be supported and readily tilted thereon. A pair of spaced bolts 29 and 30 is integrally secured to base A at diagonal corners, the bolts being sufficiently long to extend through and a convenient distance above base B.

Base B, as detailed in Figs. 9, 10 and 11, is provided on its underside with a pair of spaced concave recesses 31 and 32 which are adapted to receive and to accommodate the rounded upper ends of pivot posts 27 and 28 extending above base A. The opposite sides of base B have cut-away portions 33 and 34 to provide free working space above slots 25 and 26 of base A. Base B is also provided with a pair of slotted bolt holes 35 and 36 at diagonal corners to accommodate bolts 29 and 30 in base A. A pair of spaced pivot posts 37 and 38 is integrally secured to and centrally of the base at opposite sides, the upper ends of the posts being rounded, as shown, so that base C may be supported and tilted thereon. These pivot posts are aligned at right angles to pivot posts 27 and 28 of base A. A pair of spaced bolts 39 and 40 is integrally secured to base B at diagonal corners, the bolts being sufficiently long to extend through and a convenient distance above base C.

Base C, as detailed in Figs. 12, 13 and 14, is provided on its underside with a pair of spaced concave recesses 41 and 42 which are adapted to receive and accommodate the rounded upper ends of pivot posts 37 and 38 extending above base B. The diagonal corners 43 and 44 are cut away, as shown, to permit ready access to bolts 29 and 30 extending above base B. Base C is also provided with a pair of slotted bolt holes 45 and 46 at the other diagonal corners to accommodate bolts 39 and 40 in base B. The upper side of base C is provided with a circular recess 47 adapted to receive and accommodate the lower portion of base D. A spaced pair of threaded bolt holes 48 and 49 extend through base C at opposite sides.

Base D, as detailed in Figs. 15 and 16, consists of a circular bottom disk 50, preferably of metal, integrally secured to a smaller circular top disk 51 by means of countersunk screws 52. An outer annular clamping shoulder 53 is provided by the bottom disk due to the smaller diameter of the top disk. The top disk is preferably made of fiberboard or the like when the holder is used for manufacturing quartz oscillator plates. The cutter employed for that purpose is usually a circular saw. In making a cut, the saw is passed completely through the crystal; and to do this the saw is moved partly into the fiber disk. A new fiber disk may be readily substituted for the old from time to time.

Referring to Figs. 1–5, it will be seen that a pair of clamps 55 and 56 are attachable to base C by a pair of bolts 57 and 58, respectively, which extend through the clamps into threaded holes 48 and 49 in base C. The clamp has a zig-zag configuration, the outer end being provided with a narrow depending shoulder portion 59 adapted to rest on the top of base C and to pivot thereon. The other end of the clamp consists of a laterally extending portion 60 adapted to be pressed downwardly on the top of base D when bolts 57 and 58 are tightened.

Still referring to Figs. 1–5, the free ends of bolts 29 and 30 secured to base B are provided with a pair of washers 61 adapted to rest over slotted holes 35 and 36 in base B. These bolts are also provided with a pair of nuts 62 and 63. The free ends of bolts 39 and 40 secured to base B are provided with a pair of washers 64 and 65 adapted to fit over slots 45 and 46 in base C. These bolts are also provided with a pair of nuts 66 and 67.

In the manufacture of quartz oscillator plates, a crystal, or a section of a crystal, 20 is secured to the top of rotatable base 50. The crystal may be placed on fiberboard disk 51 and secured thereto by placing melted liquid tar 68 around the base of the crystal to fasten it to the fiber disk. As the tar chills it solidifies and holds the crystal in position. Base D with the crystal mounted thereon is then placed in position on the top of base C, the bottom circular disk 50 being dropped into the circular recess 47 in base C. The recess functions as a guide in the placement of base D and prevents the crystal from being moved laterally away from its normal position. Base D may be rotated within the recess to bring the crystal in desired alignment with guide channel 23 in the bottom of base A. The clamps 55 and 56 are swung into clamping position over the annular shoulder 53 of base D, and the heads of bolts 57 and 58 are turned to tighten the clamps.

The subsequent operations to determine the axes of the crystal, the details of which are not here important, are described in greater detail in copending applications, Serial Nos. 511,200; 511,202; 511,204, which issued as Patent No. 2,413,795, January 7, 1947; and 511,205, filed November 20, 1943.

The holder is mounted as a unit, for example, in a polariscope to determine the optical axis of the crystal. Base D is rotated to the left or right on base C, as necessary, and base C is tilted forward or backward on pivot posts 37 and 38 of base D, as required, to bring the optical axis of the crystal into predetermined alignment with guide channel 23 in base A. The arrangement of the parts is advantageously such that when the optical axis has been determined, it will be in parallel relationship with what may be considered a reference line or part of guide channel 23. When the optical axis has been determined, clamps 55 and 56 are rigidly secured to base D and base C is locked in its adjusted position by turning either or both of the nuts 66 and 67, as required. The optical axis is therefore locked in its adjusted position with respect to the reference line or part of fixed base A. It also follows that bases D and C are locked in their adjusted positions with respect to base B.

To determine an electrical axis of the crystal, the holder is then, for example, mounted as a unit in an X-ray device for the purpose. Base B is tilted to the left or right on pivot posts 27 and 28 of base A, as required, to bring the particular electrical axis of the crystal in predetermined alignment with the guide channel 23 in base A. The arrangement of the parts is advantageously such that when the electrical axis has been determined, it will be in perpendicular relationship with the reference line or part of guide channel 23. When the electrical axis has been determined, base B is locked in its adjusted position by turning either or both of the nuts 62 and 63, as required.

Since base D and base C were locked in their adjusted positions with respect to base B, and since the optical axis of the crystal was locked in its adjusted, specifically parallel, position with respect to the reference line of guide channel 23, it will be clear that when base B was tilted to the left or right the optical axis of the crystal remained in parallel relationship with the reference line of guide channel 23. This is necessarily the case even though bases D and C and the crystal move to the left and right simultaneously with base B in determining the electrical axis of the crystal. The result of these operations is to determine the optical and the electrical axes of the crystal and to lock them in their adjusted positions in a predetermined relationship with respect to the reference line of channel 23 in fixed base A.

With the axes of the crystal adjusted and locked in this manner, the holder and crystal are secured as a unit to a cutting device with the reference line of guide channel 23 in predetermined relationship with the cutter, a circular saw, for example. This means that the optical and electrical axes of the crystal likewise assume a predetermined position with respect to the cutter. The crystal may, therefore, be cut at any predetermined angle to make quartz oscillator plates of any desired cut.

As more fully pointed out in said copending applications, the reference line or part of the holder figures importantly when it is used to determine and orient the optical and electrical axes of a quartz crystal and to cut the quartz crystal at any predetermined angle to make oscillator plates. It will be clear that the reference line or part of the holder may be varied. For example, an edge or a face of guide channel 23, etc. may be employed. The important thing is to select a suitable reference line or part and then to operate the holder with respect to that reference line or part to obtain the advantages of the invention. It will likewise be clear that the holder specifically described may be varied in construction without departing from the invention.

I claim:

1. In a holder for the manufacture of quartz oscillator plates and the like, the improvement comprising a fixed base, the fixed base being provided with a guide portion adapted to cooperate with other apparatus for locating the holder with precision, a lower tiltable base pivotally supported by the fixed base, the lower tiltable base being tiltable with respect to the fixed base about a straight line axis at a fixed distance from the fixed base, means connecting the fixed base and the lower tiltable base for locking the two bases when the lower tiltable base is adjusted to a desired position, an upper tiltable base pivotally supported by the lower tiltable base, the upper tiltable base being tiltable with respect to the lower tiltable base and the fixed base about a straight line axis in perpendicular relationship to the other straight line axis and a fixed distance from the lower tiltable base, means connecting the lower tiltable base and the upper tiltable base for locking the two bases when the upper tiltable base is adjusted to a desired position, a rotatable base supported by and within a recess in the upper tiltable base, the rotatable base being rotatable with respect to the upper tiltable base, the lower tiltable base and the fixed base in a plane in parallel relationship to the latter straight line axis, and means connecting the upper tiltable base and the rotatable base for locking the two bases when the rotatable base is adjusted to a desired position, said fixed base being provided with a fixed reference part so that when a quartz crystal is mounted on the rotatable base, the optical axis and an electrical axis of the crystal may be placed in predetermined relationship with the reference part.

2. In a holder for the manufacture of quartz oscillator plates and the like, the improvement comprising a fixed base, the fixed base being provided with a guide portion adapted to cooperate with other apparatus for locating the holder with precision, a lower tiltable base pivotally supported on pivoting means secured to the fixed base, the lower tiltable base being tiltable with respect to the fixed base about a straight line axis at a fixed distance from the fixed base, means connecting the fixed base and the lower tiltable base for locking the two bases when the lower tiltable base is adjusted to a desired position, an upper tiltable base pivotally supported on pivoting means secured to the lower tiltable base, the upper tiltable base being tiltable with respect to the lower tiltable base and the fixed base about a straight line axis in perpendicular relation to the other straight line axis and a fixed distance from the lower tiltable base, means connecting the lower tiltable base and the upper tiltable base for locking the two bases when the upper tiltable base is adjusted to a desired position, a rotatable base supported by and within a recess in the upper tiltable base, the rotatable base being rotatable with respect to the upper tiltable base, the lower tiltable base and the fixed base in a plane in parallel relationship to the latter straight line axis, and means connecting the upper tiltable base and the rotatable base for locking the two bases when the rotatable base is adjusted to a desired position, said fixed base being provided with a fixed reference part so that when a quartz crystal is mounted on the rotatable base the optical axis and an electrical axis of the crystal may be placed in predetermined relationship with the reference part.

3. In a holder for the manufacture of quartz oscillator plates and the like, the improvement comprising a fixed base provided with at least two spaced pivot posts, a lower tiltable base pivotally supported by the pivot posts on the fixed base, an upper tiltable base pivotally supported by the lower tiltable base, and a rotatable base supported by the upper tiltable base, said tiltable bases being tiltable with respect to each other and said fixed base, the fixed base being provided with a guide portion adapted to cooperate with other apparatus for locating the holder with precision and said fixed base being provided with a fixed reference part so that when a quartz crystal is mounted on the rotatable base the optical axis and an electrical axis of the crystal may be placed in predetermined relationship with the reference part.

4. In a holder for the manufacture of quartz oscillator plates and the like, the improvement comprising a fixed base, a lower tiltable base pivotally supported by the fixed base, the lower tiltable base being provided with at least two spaced pivot posts, an upper tiltable base pivotally supported by the pivot posts on the lower tiltable base, and a rotatable base supported by the upper tiltable base, said tiltable bases being tiltable with respect to each other and said fixed base, the fixed base being provided with a guide portion adapted to cooperate with other apparatus for locating the holder with precision and said fixed base being provided with a fixed reference part so that when a quartz crystal is mounted on the rotatable base the optical axis and an electrical axis of the crystal may be placed in predetermined relationship with the reference part.

5. In a holder for the manufacture of quartz oscillator plates and the like, the improvement comprising a fixed base provided with at least two spaced pivot posts, a lower tiltable base pivotally supported by the pivot posts on the fixed base, said lower tiltable base being provided with at least two spaced pivot posts, an upper tiltable base pivotally supported by the latter pivot posts on the lower tiltable base, and a rotatable base supported by the upper tiltable base, said tiltable bases being tiltable with respect to each other and said fixed base, the fixed base being provided wtih a guide portion adapted to cooperate with other apparatus for locating the holder with precision and said fixed base being provided with a fixed reference part so that when a quartz crystal is mounted on the rotatable base the optical axis and an electrical axis of the crystal may be placed in predetermined relationship with the reference part.

6. In a holder for the manufacture of quartz oscillator plates and the like, the improvement comprising a fixed base provided with at least two spaced pivot posts, a lower tiltable base pivotally supported by the pivot posts on the fixed base, said fixed base being provided with at least two spaced bolts extending through the lower tiltable base and adapted to tilt the lower tiltable base on the pivot posts, an upper tiltable base pivotally supported by the lower tiltable base, and a rotatable base supported by the upper tiltable base, said tiltable bases being tiltable with respect to each other and said fixed base.

7. In a holder for the manufacture of quartz oscillator plates and the like, the improvement comprising a fixed base, a lower tiltable base pivotally supported by the fixed base, the lower tiltable base being provided with at least two spaced pivot posts, an upper tiltable base pivotally supported by the pivot posts on the lower tiltable base, said lower tiltable base being provided with at least two spaced bolts extending through the upper tiltable base and adapted to tilt the upper tiltable base on the pivot posts, and a rotatable base supported by the upper tiltable base, said tiltable bases being tiltable with respect to each other and said fixed base.

8. In a holder for the manufacture of quartz oscillator plates and the like, the improvement comprising a fixed base provided with at least two spaced pivot posts, a lower tiltable base pivotally supported by the pivot posts on the fixed base, said fixed base being provided with at least two spaced bolts extending through the lower tiltable base and adapted to tilt the lower tiltable base on the pivot posts, said lower tiltable base being provided with at least two spaced pivot posts, an upper tiltable base pivotally supported by the latter pivot posts on the lower tiltable base, said lower tiltable base being provided with at least two spaced bolts extending through the upper tiltable base and adapted to tilt the upper tiltable base on the latter pivot posts, and a rotatable base supported by the upper tiltable base, said tiltable bases being tiltable with respect to each other and said fixed base.

WILLIAM C. SPEED.

REFERENCES CITED

The following references are of record in the file of this patent:

UNITED STATES PATENTS

| Number | Name | Date |
|---|---|---|
| 1,377,884 | Heryngfel et al. | May 10, 1921 |
| 1,414,970 | Nelson | May 2, 1922 |
| 1,463,706 | Ketchum | July 31, 1923 |
| 1,766,037 | Dawson | June 24, 1930 |
| 1,889,248 | Kilmer | Nov. 29, 1932 |
| 2,111,299 | Robbins | Mar. 15, 1938 |
| 2,304,238 | Broughton | Dec. 8, 1942 |
| 2,308,703 | McCain | Jan. 19, 1943 |
| 2,364,478 | Schreiber | Dec. 5, 1944 |